United States Patent
Shi (10) Patent No.: US 9,428,698 B2
(45) Date of Patent: Aug. 30, 2016

(54) METHOD AND APPARATUS FOR CONTROLLING CATALYST IN REACTION ZONES AND PURIFYING AND COOLING REGENERATED CATALYST

(71) Applicant: Baozhen Shi, Shandong (CN)

(72) Inventor: Baozhen Shi, Shandong (CN)

( * ) Notice: Subject to any disclaimer, the term of this patent is extended or adjusted under 35 U.S.C. 154(b) by 0 days.

(21) Appl. No.: 14/441,227

(22) PCT Filed: Nov. 6, 2013

(86) PCT No.: PCT/CN2013/086630
§ 371 (c)(1),
(2) Date: May 7, 2015

(87) PCT Pub. No.: WO2014/071842
PCT Pub. Date: May 15, 2014

(65) Prior Publication Data
US 2015/0284641 A1    Oct. 8, 2015

(30) Foreign Application Priority Data
Nov. 7, 2012 (CN) .......................... 2012 1 0440500

(51) Int. Cl.
*B01J 8/26* (2006.01)
*C10G 11/18* (2006.01)
(Continued)

(52) U.S. Cl.
CPC .............. *C10G 11/182* (2013.01); *B01J 8/003* (2013.01); *B01J 8/0055* (2013.01); *B01J 8/1863* (2013.01);
(Continued)

(58) Field of Classification Search
CPC ........ C10G 3/60; C10G 3/62; C10G 11/182; C10G 11/187; B01J 8/003; B01J 8/0055; B01J 8/1863; B01J 8/26; B01J 2208/00752; B01J 2208/00849
See application file for complete search history.

(56) References Cited

U.S. PATENT DOCUMENTS 4,478,708 A * 10/1984 Farnsworth ............ B01J 8/0055
208/120.01
4,875,994 A   10/1989 Haddad et al.
(Continued)

FOREIGN PATENT DOCUMENTS

CN    99213769.1    5/2000
CN    01119805.2    1/2003
(Continued)

*Primary Examiner* — Brian McCaig
(74) *Attorney, Agent, or Firm* — Coats and Bennett PLLC (57) ABSTRACT

A process and an apparatus used in the catalytic reaction process with feed of petroleum hydrocarbons or alcohols for controlling catalyst in reaction zones, purifying, heat transferring and cooling regenerant are provided. The apparatus comprises a catalyst regenerator, an external heat exchanger, a purifying controller for regenerant, a reactor and catalyst conveying pipes. The regenerator is connected with the external heat exchanger and the purifying controller for regenerant respectively, and the purifying controller for regenerant is connected with the reactor via two conveying pipes. The process for controlling reaction and catalyst participating in the reaction comprises the following parts: controlling contact gasification reaction of liquid phase feed, controlling gas phase reaction, at first withdrawing the regenerant from the purifying controller and removing nitrogen, oxygen, carbon dioxide and gaseous impurities carried with the regenerant, then feeding the regenerant into the reactor under the feeding point of feed and above the gasification contact zone after the control temperature reached the reaction requirement. The three-level control of the reactor, before reaction, after liquid phase gasification reaction and outlet reaction conditions of the reactor, is realized, while nitrogen and oxygen carried with the regenerant are limited to fed into the reactor. The yield of products is improved.

7 Claims, 8 Drawing Sheets

(51) Int. Cl.
*C10G 3/00* (2006.01)
*B01J 8/18* (2006.01)
*B01J 8/00* (2006.01)

(52) U.S. Cl.
CPC .. *B01J 8/26* (2013.01); *C10G 3/62* (2013.01); *B01J 2208/00752* (2013.01); *B01J 2208/00849* (2013.01); *Y02P 30/20* (2015.11); *Y02P 30/446* (2015.11)

(56) References Cited

U.S. PATENT DOCUMENTS

| | | | |
|---|---|---|---|
| 5,800,697 A | 9/1998 | Lengemann | |
| 5,858,207 A * | 1/1999 | Lomas | B01J 38/04 208/113 |
| 6,059,958 A | 5/2000 | Ramos et al. | |
| 6,558,530 B2 | 5/2003 | Schlosser et al. | |

FOREIGN PATENT DOCUMENTS

| | | |
|---|---|---|
| CN | 200510055695.4 | 9/2005 |
| CN | 200610127585 | 3/2008 |
| CN | 200610113673 | 4/2008 |
| CN | 200710054737 | 6/2008 |
| CN | 200710054738 | 6/2008 |
| CN | 200710054739 | 6/2008 |
| CN | 101474582 A | 7/2009 |
| CN | 201485421 U | 5/2010 |
| CN | 202021041 U | 11/2011 |
| CN | 102277193 A | 12/2011 |
| CN | 102391889 A | 3/2012 |
| CN | 102399575 A | 4/2012 |
| CN | 102942953 A | 2/2013 |

* cited by examiner

METHOD AND APPARATUS FOR CONTROLLING CATALYST IN REACTION ZONES AND PURIFYING AND COOLING REGENERATED CATALYST

TECHNICAL FIELD

The present invention relates to a catalytic reaction technique in the petrochemical industry field, in particular relates to a method for controlling catalyst in the catalytic reaction and cooling and purifying regenerated catalyst, and an apparatus for controlling catalyst within reaction zones and purifying and cooling regenerated catalyst, used for carrying out this method.

RELATED ART

In the catalytic reaction process, catalyst is important, but the performance of the catalyst in the reaction process is different from the performance of the catalyst prior to the reaction. With hydrocarbons or alcohols as reaction feedstock materials, the catalyst suffers from coking, alkaline components, metal contamination, and deactivation in the reaction process, so that performance of the catalyst in the actual reaction process is far lower than the performance of the catalyst prior to the reaction. Such reaction conditions as activity of catalyst, a ratio of reaction catalyst to oil, space velocity, temperatures of reaction feedstock material and catalyst and their difference in the reaction process, and the like, are important factors which have an influence on the reaction result.

Control and selection of reaction conditions in the reaction process is directly related to the reaction conversion rate and selectivity. Currently, there are many techniques for optimizing the operation of the reaction system. Taking catalytic conversion reaction as an example, dry gas pre lifting technology, mixed temperature control technology by changing the feedstock material injection point and injection medium, outlet zone rapid separation technology, quench termination technology, and so on have an obvious influence on the reaction result and have been well applied in industry. The improvement and control of the performance of the catalyst in the reaction process is also crucial. Many gas-solid reaction processes require solid phase objects such as catalyst to be cooled, so as to carry out the reaction after the reaction conditions have been improved. Especially for a gas-solid reaction process such as the catalytic conversion reaction, adequate cooling of the regenerated catalyst can improve a ratio of catalyst to oil, thereby inhibiting the thermal cracking reaction and improving proportion of products.

With the catalytic conversion of petroleum hydrocarbons as feedstock material, the studies all over the world have proved that higher temperature of regenerated catalyst has resulted in a lower ratio of reaction catalyst to oil and a higher temperature difference from the contacted reaction material, which will lead to high yield of dry gas and have a significant impact on the yield; as reaction is carried out, activity of the catalyst within a riser is decreased rapidly, so that the efficiency within a reaction zone downstream the riser is decreased, thus affecting the reaction effect. The goal which has been pursued for many years is to provide a catalytic cracking apparatus which has a low temperature of regenerated catalyst, an improved ratio of catalyst to oil and improved activity of the catalyst within the riser.

There are two reaction zones including a liquid phase gasification contact reaction zone and a gas phase reaction zone in a liquid feedstock material catalytic reaction using a tube reactor. Both a difference between the temperatures of catalyst and feedstock material in the liquid phase gasification reaction zone and the high temperature of catalyst will increase the thermal cracking reaction, thus increasing the proportion of by-products below C2, and affecting economic benefits.

There are many technical measures to reduce the difference between the temperatures of regenerated catalyst and the feedstock oil in the reaction feedstock material liquid phase gasification contact reaction zone. In order to reduce the initial contact temperature of the feedstock oil, it is the most easily-thought way to "introduce the cooled catalyst within the external cooler into the pre lifting section of the riser". UOP put forward a method wherein the cooled catalyst within the external cooler is introduced into the pre lifting section of the riser, in the U.S. Pat. No. 5,800,697 in the 90's of the last century. Similar methods are disclosed in may patent applications, such as U.S. Pat. No. 6,059,958, U.S. Pat. No. 6,558,530B1, Chinese patent applications No. 01119805.1, 200510055695.4, 200710054738.1, 200710054739 etc.

U.S. Pat. No. 5,800,697 discloses a catalytic conversion reaction-regeneration method, wherein a cooling zone is disposed near the regenerator, hot regenerated catalyst from the dense bed is fed into the cooling zone through an outlet and is heat exchanged to a suitable temperature, and is then fed through a regeneration standpipe and a slide valve into the bottom portion of the riser reactor to take part in the reaction, so that the reaction temperature becomes an independent variable. Chinese patent application No. 200610113673.3 discloses a method for converting hydrocarbons, wherein hot regenerated catalyst is cooled by a cooler, returns to a bottom of the reactor, contacts and takes a cracking react with feedstock oil, and used catalyst is stripped and then transported to the regenerator, and is subjected to coke-burning regeneration and then circulated for reuse or is partially fed directly into a mixer at the bottom of the reactor. Chinese patent application No. 200710054738.6 discloses a device of adjusting temperature of regenerated catalyst for a catalytic cracking apparatus, wherein a catalyst cooler is disposed near the dense bed of the regenerator, the catalyst cooler being provided within it with a heat exchanger tube and being provided on a upper portion thereof with a gas return pipeline, a fluidization ring being disposed in sections along the vertical height of the catalyst cooler, and the cooled regenerated catalyst is fed into the pre lifting section of the riser reactor to take part in the reaction. Chinese patent application No. 200710054737.1 also discloses a device of adjusting temperature of the regenerated catalyst for the catalytic cracking apparatus, wherein the regenerator dense bed is provided within it with a partition plate, which divides the regenerator dense bed into two zones, one zone being regeneration and burning zone, the other zone being catalyst cooling zone, and wherein an inlet is provided under the partition plate for the entry of the cooled catalyst, a heat exchanger tube is provided within the catalyst cooling zone, and the cooled regenerated catalyst is fed into the pre lifter of the riser reactor so as to take part in reaction.

Another method to reduce the difference between the temperatures of the feedstock oil and the regenerated catalyst which initially contact the oil is to increase the temperature of the feedstock oil. Chinese patent application No. 200610127585.9 discloses a hydrocarbon oil cracking method, wherein hydrocarbon oil and regenerated catalyst are heated within a heat exchanger, and after the heat exchanging, the hydrocarbon oil and the regenerated catalyst contact and react within the reactor.

There have been techniques for optimizing the reaction conditions, mainly focusing on optimization of the reaction feedstock material flow, and optimization of reaction time and temperature. Nevertheless, less attention has been paid to optimization of the performance of the catalyst in the reaction process. The above mentioned patent documents only relate to reduction in the temperature of regenerated catalyst in the pre lifting section.

In the above-mentioned patent documents in which the temperature of the regenerated catalyst is reduced, some oxygen and regenerated flue gas are carried by catalyst from the external cooler, this oxygen is fed into the reactor and reacts with the reaction medium, thus resulting in the problem that the oxygen fed into the reactor have an influence on the products, and the flue gas carried by the regenerated catalyst will increase the load of the rich gas compressor, thus increasing energy consumption.

In addition, controlling the reaction catalyst includes controlling the temperature of the catalyst before reaction, the contact temperature difference and a ratio of catalyst to oil in the liquid phase gasification reaction zone. Further, control of activity of catalyst and a ratio of catalyst to oil have an important influence on the reaction effect.

Activity of catalyst at the outlet of the current riser reactor is as strong as merely about ⅓ of the initial activity, and at a second half section of the riser reactor, activity of catalyst and selectivity has been decreased dramatically, thereby deteriorating catalytic action, so that the proportion of the thermal cracking reaction and other adverse secondary reactions is increased. As activity of catalyst is decreased, selectivity of catalytic reaction is necessarily decreased, so that the secondary reaction is naturally increased. Controlling activity of catalyst at the rear half section of the riser reactor is an important task. CN99213769.1 discloses a tandem riser reactor for catalytic cracking, wherein the reactor consists of two risers connected end to end in series. This technology strengthens catalytic cracking reaction process of the conventional riser, so as to improve activity of catalyst and selectivity. However, the technology is limited to the principle, and lacks operational implementation, so that the implementation of the project involves the construction of two catalytic cracking apparatus overlapping one on the other, thus resulting in high investment cost and small possibility of implementation.

Control of the catalyst in the reaction process should include control of catalyst in the gas phase reaction zone, control of the state of the supplied catalyst and control of gases carried by catalyst, as well as control of those in liquid phase gasification reaction zone.

Furthermore, control of the temperature of the catalyst fed into the reactor is very important, when the gas phase reaction zone of the reactor is supplemented with catalyst. This catalyst will affect the thermal balance of the reaction, which has effect on not only the temperature at the outlet of the reactor but also the contact gasification zone. As long as the temperature of catalyst adapts to the requirements of reaction, the reaction will be improved.

Therefore, it is important to control the catalyst fed into the reactor.

SUMMARY OF THE INVENTION

The main object of this invention is to provide a method of controlling catalyst in reaction zones and purifying and cooling regenerated catalyst, so as to realize a convenient and flexible multiple-level control of the catalyst in reaction zones, and reduce energy consumption.

Another object of this invention is to provide an apparatus for carrying out the method.

To this end, the invention provides a method for controlling catalyst in reaction zones and cooling regenerated catalyst, used in the catalytic reaction process with feed of petroleum hydrocarbons or alcohols. The method includes controlling reaction and controlling catalyst which takes part in reaction, and includes a reactor, a catalyst regenerator, controlling liquid phase contact gasification reaction, controlling gas phase reaction, controlling regenerated catalyst purification, and catalyst delivery pipes; wherein controlling regenerated catalyst purification includes controlling the temperature of catalyst and controlling gases carried by the catalyst, wherein the method further includes a regenerated catalyst purification controller, controlling catalyst, controlling medium, temperature detection, and adjusting a control valve. The method for controlling catalyst in reaction zones and cooling regenerated catalyst according to the present invention consists of the following steps:

1. In the step of controlling regenerated catalyst purification, the regenerated catalyst is fed into the reactor through three passages, wherein some of the regenerated catalyst from the regenerator is fed directly into a bottom of the reactor through a regeneration standpipe, and after the rest of the regenerated catalyst within the purification controller reaches a required temperature and gas mediums carried by the regenerated catalyst are replaced, the rest of the regenerated catalyst is fed into the reactor through one or two delivery pipes, wherein through a first delivery pipe of the two delivery pipes, the catalyst is fed downward under the action of gravity below a reaction feedstock material feed point, and mixes with the regenerated catalyst fed through the regeneration standpipe, thereby decreasing a temperature of the regenerated catalyst within the reactor, controlling a temperature of the regenerated catalyst before contacting the feedstock oil by adjusting an amount of the catalyst which is fed from the regenerated catalyst purification controller and improving a ratio of catalyst to oil, and wherein through a second delivery pipe of the two delivery pipes, the purified catalyst is fed downward under the action of gravity into a gas phase reaction zone above the reaction feedstock material feed point;

2. The temperature of the catalyst within the regenerated catalyst purification controller is controlled depending on the temperature within the gas phase reaction zone of the reactor above the reaction feedstock material feed point, so that the catalyst fed into the gas phase reaction zone adapts to reaction conditions of the gas phase reaction zone. In order to realize this requirement of the invention, a temperature measurement point, which typically is a thermocouple, is disposed within the reaction zone between the catalyst feed point of the gas phase reaction zone of the reactor and the reaction feedstock material feeding point and within the regenerated catalyst purification controller respectively, wherein the opening of the adjustment valve in the operating medium pipeline of the regenerated catalyst purification controller is controlled depending on a difference between the two measured temperatures, or depending on a difference between a temperature at the outlet of the reactor and the temperature within the regenerated catalyst controller, so that the adjustment valve in turn adjusts an amount of the operating medium fed into the regenerated catalyst, achieving the control of the temperature of the catalyst within the regenerated catalyst purification controller in association with the reaction temperature within the reactor, such that the catalyst fed into the gas phase reaction zone of the reactor always adapts to the conditions within the reactor, or wherein the opening of the adjustment valve in the operating medium pipeline of the regenerated catalyst purification controller is controlled depending on the temperature within the regenerated catalyst controller, thus adjusting an amount of the fed fluidization medium and achieving the control of the temperature of the regenerated catalyst purification controller;

3. An amount of catalyst which is fed into the reactor via the regenerated catalyst purification controller is controlled. A catalyst temperature measurement point, which typically is a thermocouple, is disposed below the feedstock material feed point of the reactor, and the opening of the slide valve in the first delivery pipe of the regenerated catalyst purification controller is controlled depending on the temperature of this point, thereby adjusting an amount of the catalyst which is fed from the regenerated catalyst purification controller into the reactor; and wherein an amount of the catalyst which is fed from the regenerated catalyst purification controller into the gas phase reaction zone of the reactor is controlled depending on the opening of the slide valve in the second delivery pipe;

4. An amount of oxygen which is carried by the catalyst fed from the regenerated catalyst purification controller into the reactor and an amount of flue gas which is carried by the regenerated catalyst are controlled. According to the present invention, the regenerated catalyst purification controller uses steam as the operating medium, which is used to replace the flue gases carried by the regenerated catalyst and control the temperature of the catalyst, or air and steam are disposed as two operating media, the steam being fed into the regenerated catalyst purification controller below the air; an amount of the air is adjusted so as to vary the temperature of the catalyst; an amount of the steam is adjusted so as to control the temperature of the catalyst and the components of the carried gases.

According to the present invention, the catalyst of the regenerated catalyst purification controller is fed through the second delivery pipe into the gas phase reaction zone of the reactor within a space occupying a reaction time of between 0.1 s and 1.0 s above from the reaction feedstock material feed point or within a region spaced by a distance of between 1.0 m and 10 m above from the reaction feedstock material feed point.

According to the present invention, the regenerated catalyst purification controller is provided within an upper portion thereof with a heat exchanger tube, within which the reaction feedstock material is heated while the regenerated catalyst is cooled, and then fed into the reactor, or within which the steam is generated.

According to the present invention, before the reaction feedstock material is fed into and heated within the heat exchanger tube of the regenerated catalyst purification controller, the reaction feedstock material is filled with water which occupies not more than 20% by weight of the reaction feedstock material, wherein the reaction feedstock material is heated and then fed into the reactor.

According to the present invention, the step of cooling regenerated catalyst includes controlling regenerated catalyst purification, controlling the replacement of the carried gases, controlling the temperature of the regenerated catalyst, adjusting steam and stripped gases discharging pipeline, and regenerated catalyst feeding and discharging pipelines. The regenerated catalyst is fed through an inlet pipe and discharged through one or two delivery pipes and fed into the reactor; steam is fed into the bottom region of the regenerated catalyst purification controller, and the stripped gases and the gases carried by the regenerated catalyst are discharged from the upper portion, a steam feeding pipeline being provided with an adjustment valve, which is controlled by the temperature of the catalyst within the regenerated catalyst purification controller or by the difference between the temperature at the corresponding point of the reaction zone and the temperature of the catalyst within the regenerated catalyst purification controller.

According to the present invention, in the method for controlling catalyst in reaction zones and purifying the regenerated catalyst, in addition to the heat exchanger tube, the regenerated catalyst purification controller is provided within it with a stripper for stripping the gases carried by the catalyst, the stripper being disposed under the heat exchanger tube.

According to the present invention, in the step of controlling reaction regenerated catalyst, the gas phase reaction zone of the reactor is provided at the cooled catalyst feed point with a catalyst mixing and distributing section, which has a diameter greater than a diameter of the reactor at this point.

According to the present invention, the gas phase reaction zone of the reactor is configured as a riser reactor, or a diameter enlarged reaction section is disposed at the point for feeding the catalyst above the mixing and distributing section, wherein within the diameter enlarged reaction section, a flow speed of gas phase varies from 1.8 m/s to 4.0 m/s, and the reaction time varies from 3.0 s to 5.5 s.

The present invention also provides an apparatus for controlling catalyst in reaction zones and purifying and cooling regenerated catalyst, used for carrying out the method, comprising a regenerator, an external cooler, a regenerated catalyst purification controller and a reactor, wherein the regenerator is connected with both the external cooler and the regenerated catalyst purification controller which is connected with the reactor via two delivery pipes, a first delivery pipe extending from a bottom of the regenerated catalyst purification controller to a catalyst mixing riser, and a second deliver pipe extending from a middle and low portion of the regenerated catalyst purification controller to a connecting port of a catalyst distributor above a feed nozzle of the reactor.

According to a particular embodiment of the present invention, the reactor in the present invention is configured as a riser reactor, and a gas phase reaction zone of the riser reactor may be provided with a diameter enlarged reaction zone.

The apparatus for carrying out the method of controlling catalyst in reaction zones and purifying and cooling regenerated catalyst according to the present invention can be shown with reference to FIGS. 1-8.

The tasks of the invention are fulfilled in the following manner:

Regenerated catalyst from the regenerator is fed through the regeneration standpipe into the reactor below the feed nozzle, and returns to the regenerator via a stripping section after the reaction finishes. The rest of regenerated catalyst from the regenerator is treated by the regenerated catalyst purification controller and is then fed into the reactor. The temperature of the cooled catalyst is controlled depending on the temperature of the temperature measurement point disposed at the gas phase reaction zone of the reactor or on the difference between these two temperatures, or the temperature of the regenerated catalyst which is cooled is controlled depending on the temperature at the outlet of the reactor or on the difference between these two temperatures.

The catalyst within the regenerated catalyst purification controller is then stripped by steam so as to remove oxygen and other gases carried by the catalyst, and is fed under the action of gravity via two delivery pipes into different portions of the reactor. After the reaction finishes, the catalyst is stripped before returning to the regenerator. The steam is fed into the regenerated catalyst purification controller at the bottom thereof, passes upward through a stripping zone and a cooling zone, and is discharged through the upper discharging pipeline;

The temperature of the catalyst below the feedstock material feed point of the reactor is controlled by the slide valve in the first delivery pipe of the regenerated catalyst purification controller; the reaction temperature between the feedstock material feed point and the gas phase reaction zone of the reactor is controlled by the slide valve in the regeneration standpipe; the temperature at the outlet of the reactor is controlled by the slide valve in the second delivery pipe which controls an amount of catalyst which is fed from the regenerated catalyst purification controller; or the temperature at the outlet of the reactor is controlled by the slide valve in the regeneration standpipe; and the temperature of the catalyst within the regenerated catalyst purification controller is controlled by the difference between the temperature of the catalyst and the temperature at the disposed point of the reactor, depending on the amount of the fed gases which is adjusted by the adjustment valve.

As compared with the prior art, the present invention produces the following advantageous effects:

First, in addition to the supplementation of the cooled regenerated catalyst below the feed point of the reactor, the present invention may supplement the gas phase reaction zone in a convenient manner with catalyst which has high activity, has a temperature corresponding to the reaction temperature, and is stripped of the carried gases, thereby increasing activity of catalyst within the gas phase reaction zone and a ratio of the reaction catalyst to oil;

Second, by the step for controlling the temperature of the cooled regenerated catalyst depending on the reaction temperature within the reactor, the present invention causes the catalyst fed into the reaction to have no influence on thermal balance of the reaction, so that the ratio of catalyst to oil within the gas phase reaction zone may be increased freely, regardless of the density and boiling point of the reaction feedstock material;

Third, the catalyst fed into the reaction zone according to the present invention has been purified by replacing the carried oxygen, nitrogen, and other gases coming from the regenerator, thereby eliminating the influence of these gases on the reaction and decreasing the load of the gas compressor and energy consumption;

Fourth, the present invention realizes the feeding of the catalyst into the reactor under the action of gravity after cooling the regenerated catalyst, without the need for delivery medium, so that no other influences are added to the reaction except for the catalyst, and energy consumption is low; and Fifth, the present invention realizes the multiple-level control of the reaction catalyst by the regenerated catalyst purification controller.

REFERENCE SIGNS LIST

I feedstock material and catalyst contact gasification zone of reactor
II gas phase reaction zone of reactor
III diameter enlarged reaction section
1 regenerator
2 regenerated catalyst purification controller
3 reactor
11 transition section of regenerator
12 coke-burning drum of regenerator
13 external cooler
14 slide valve of external cooler
15 flue gas pipe of external cooler
21, 22 expansion joint
23, 24 catalyst delivery pipe of regenerated catalyst purification controller
25, 26 slide valve in catalyst delivery pipe of regenerated catalyst purification controller
27 stripping zone of regenerated catalyst purification controller
28 cooling zone of regenerated catalyst purification controller
29 upper discharging pipe of regenerated catalyst purification controller
30 catalyst mixing riser
31 feed nozzle
32 catalyst distributor
33 regeneration standpipe
34 used catalyst standpipe
35 stripping section
36 cyclone separator
37 settler;
38 regeneration slide valve
40 pressurized air
41 fed water
42 mixture of water and steam
43 steam or air
44, 46, 47, 48 steam
45 atomizing steam
49 quenching medium
50 air pressure booster
51 pre lifting medium
52 feedstock oil
53 recycle oil 54, 58 accident by-pass line;
55 feedstock material
2, 56 slurry
57 feedstock oil and recycle oil mixer
59 mixed oil of feedstock oil and recycle oil
80 catalyst temperature measuring point of regenerated catalyst purification controller
81 difference between the temperatures of the purification controller and the supplement temperature measuring point at gas phase reaction zone
83 temperature measuring point at catalyst mixing pre lifting section
84 supplement temperature measuring point at gas phase reaction zone
85 reaction temperature measuring point at the outlet of the reactor
90 valve for adjusting steam or air fed into regenerated catalyst purification controller
91 valve for adjusting steam fed into regenerated catalyst purification controller
92 valve for adjusting pressurized air fed into regenerated catalyst purification controller

DETAILED DESCRIPTION

Embodiments of the present invention will be described in detail with reference to examples and the drawings, but the scope of the invention includes but is not limited to the embodiments.

The invention provides a method for controlling catalyst in reaction zones and purifying and cooling regenerated catalyst, the method being mainly used in the catalytic reaction process with feed of petroleum hydrocarbons or alcohols; the method comprises controlling reaction and controlling catalyst fed into a reactor, wherein an apparatus used in the method comprises a reactor, a catalyst regenerator, a regenerated catalyst purification controller, and catalyst delivery pipes, wherein controlling reaction includes controlling liquid phase contact gasification reaction, controlling gas phase reaction, and controlling a temperature at an outlet of the reactor, and wherein controlling catalyst fed in the reactor includes controlling a temperature of the regenerated catalyst and controlling purification of gases carried by the catalyst fed into the reactor, wherein the regenerated catalyst is fed into the purification controller and is then cooled by a heat exchanger tube, thereby controlling the temperature, and simultaneously, the carried gases including nitrogen, carbon dioxide, and oxygen are replaced by steam, the catalyst which reaches a required temperature and meets the requirements for the carried gases is fed downward under the action of gravity through the catalyst delivery pipes into the reactor below a reaction feedstock material feed point and/or above a reaction feedstock material and catalyst contact gasification zone, so that the reactor realizes a multiple-level control of reaction conditions before reaction, after liquid phase gasification reaction and at the outlet of the reactor, and simultaneously, nitrogen, oxygen and carbon dioxide carried by the regenerated catalyst are limited to be fed into the reactor.

According to the present invention, in the step of controlling the catalyst fed into the reactor, the regenerated catalyst is fed into the reactor through three passages, wherein some of the regenerated catalyst from the regenerator is fed directly into a bottom of the reactor through a regeneration standpipe, and after the rest of the regenerated catalyst is cooled within the purification controller so that the temperature is controlled to reach the required temperature, and gas mediums carried by the regenerated catalyst are replaced, the rest of the regenerated catalyst is fed into the reactor through two delivery pipes, each of which is provided therein with a valve for controlling a flow of catalyst, wherein through a first delivery pipe of the two delivery pipes, the catalyst from the regenerated catalyst purification controller is fed downward under the action of gravity into the reactor below the reaction feedstock material feed point, and mixes with the regenerated catalyst fed through the regeneration standpipe, thereby decreasing a temperature of the regenerated catalyst within the reactor, wherein an amount of the catalyst which is fed from the regenerated catalyst purification controller is adjusted, thereby controlling a temperature of the regenerated catalyst before contacting the feedstock oil and improving a ratio of the catalyst to the feedstock oil, wherein through a second delivery pipe of the two delivery pipes, the purified catalyst is fed downward under the action of gravity into a gas phase reaction zone above the reaction feedstock material feed point, wherein a catalyst temperature measurement point is disposed below the reaction feedstock material feed point, and the opening of the valve in the first delivery pipe is controlled depending on the temperature of this point, thereby adjusting an amount of the catalyst which is fed into the reactor; and wherein an amount of the catalyst which is fed into the reactor is controlled depending on the opening of the valve in the second delivery pipe.

According to the present invention, purifying and cooling the regenerated catalyst comprises controlling regenerated catalyst purification, stripping the carried gases, controlling the temperature of catalyst, adjusting steam, a stripped gas discharging pipe, and regenerated catalyst feeding and discharging pipes, wherein the regenerated catalyst is fed through one input pipe and is discharged through one or two delivery pipes into the reactor, the steam is fed into a bottom, stripping medium and the gases carried by the regenerated catalyst are discharged from an upper portion, a water input pipe is provided therein with an adjustment valve, which is controlled depending on the temperature of the catalyst within the regenerated catalyst purification controller or a difference between the temperature at the corresponding point in the reaction zone and the temperature of the catalyst within the regenerated catalyst purification controller.

According to the present invention, the temperature of the catalyst within the regenerated catalyst purification controller is controlled depending on the temperature within a gas phase reaction zone of the reactor above the feeding point, so that the catalyst fed into the gas phase reaction zone adapts to reaction conditions of the gas phase reaction zone, wherein a temperature measurement point is disposed within the reaction zone between the catalyst feeding point and the reaction feedstock material feed point of the gas phase reaction zone of the reactor and within the regenerated catalyst purification controller respectively, wherein the opening of the adjustment valve in the operating medium pipeline of the regenerated catalyst purification controller is controlled depending on a difference between the temperatures of these two temperature measurement points, or depending on a difference between a temperature at the outlet of the reactor and the temperature within the regenerated catalyst controller, so that the adjustment valve in turn adjusts an amount of the operating medium fed into the regenerated catalyst, achieving the control of the temperature of the catalyst within the regenerated catalyst purification controller in association with the reaction temperature within the reactor, such that the catalyst fed into the gas phase reaction zone of the reactor always adapts to the conditions within the reactor, or wherein the opening of the adjustment valve in the operating medium pipeline of the regenerated catalyst purification controller is controlled depending on the temperature within the regenerated catalyst controller, thus adjusting an amount of the fed fluidization medium and achieving the control of the temperature of the catalyst output from the regenerated catalyst purification controller.

According to the present invention, the regenerated catalyst purification controller uses steam as the operating medium, which is used to replace the flue gases carried by the regenerated catalyst and control the temperature of the catalyst, or air and steam are disposed as two operating media, the steam being fed into the regenerated catalyst purification controller below the air; an amount of the air is adjusted so as to vary the temperature of the catalyst; an amount of the steam is adjusted so as to control the temperature of the catalyst and the effects of replacing the carried gases.

According to the present invention, the catalyst of the regenerated catalyst purification controller is fed through the second delivery pipe into the gas phase reaction zone of the reactor within a space occupying a reaction time of between 0.1 s and 1.0 s above from the reaction feedstock material feeding point or within a region spaced by a distance of between 1.0 m and 10 m above from the reaction feedstock material feeding point.

According to the present invention, the regenerated catalyst purification controller is provided within an upper portion thereof with a heat exchanger tube, within which the reaction feedstock material is heated while the regenerated catalyst is cooled, and is then fed into the reactor, or within which the steam is generated, wherein the regenerated catalyst purification controller is provided within a lower portion thereof with a region where the gases carried by the catalyst are replaced.

According to the present invention, before the reaction feedstock material is fed into and heated within the heat exchanger tube of the regenerated catalyst purification controller, the reaction feedstock material is filled with water which occupies not more than 20% by weight of the reaction feedstock material, wherein the reaction feedstock material is heated and then fed into the reactor.

According to the present invention, the gas phase reaction zone of the reactor is provided at a point for feeding the cooled purified catalyst with a catalyst mixing and distributing section, the mixing and distributing section having a diameter greater than a diameter of the reactor at this point.

According to the present invention, the gas phase reaction zone of the reactor is configured as a riser reactor, or a diameter enlarged reaction section is disposed above the mixing and distributing section at the point for feeding the cooled purified catalyst, wherein within the diameter enlarged reaction section, a flow speed of gas phase varies from 1.8 m/s to 4.0 m/s, and the reaction time varies from 3.0 s to 5.5 s.

Figure 1:
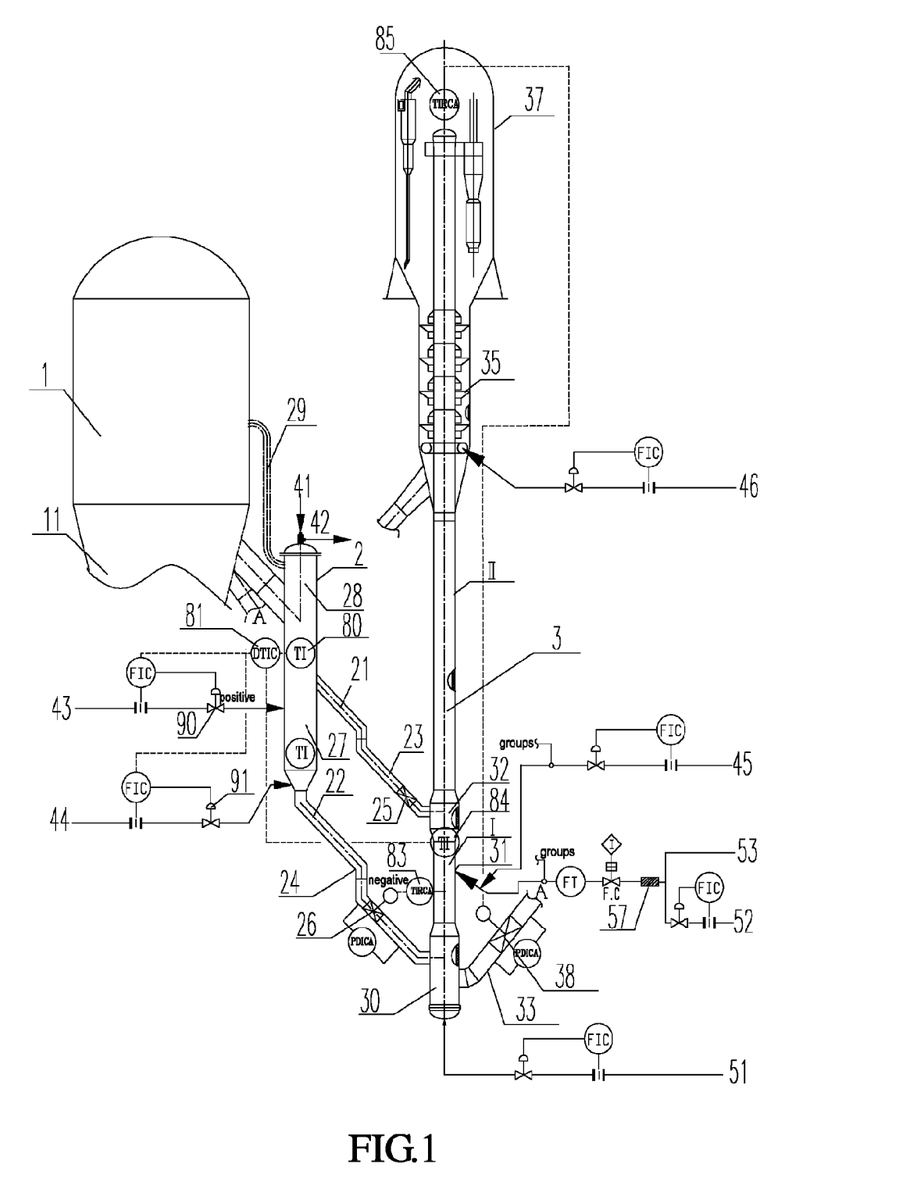
FIG. 1 is a schematic diagram showing a process of a method for controlling catalyst in reaction zones and cooling regenerated catalyst according to an embodiment of the invention.

FIG. 1 is a schematic diagram showing a process of a method for controlling catalyst in reaction zones and cooling regenerated catalyst according to an embodiment of the invention. Regenerated catalyst is fed into a reactor 3 through three passages. The regenerated catalyst from a regenerator 1 is fed directly into a catalyst mixing riser 30 at a bottom of the reactor 3 through a regeneration standpipe 33; after the reaction finishes, the regenerated catalyst is stripped of oil and gases carried by it at a stripping section 35, and returns to a coke-burning drum 12 of the regenerator through a used catalyst standpipe 34 (the used catalyst standpipe 34 and the regenerator coke-burning drum 12 are not labeled in FIG. 1, and are shown with reference to FIG. 4). The rest of the catalyst from the regenerator 1 is treated by the regenerated catalyst purification controller 2, and is then fed under the action of gravity into the reactor 3 through two delivery pipes (catalyst delivery pipes 23, 24 of regenerated catalyst purification controller); after the reaction finishes, the regenerated catalyst is stripped of oil and gases carried by it at the stripping section 35, and returns to the coke-burning drum 12 of the regenerator through the used catalyst standpipe 34. Through a first delivery pipe (catalyst delivery pipe 24 of regenerated catalyst purification controller), the catalyst is fed downward under the action of gravity into a catalyst mixing riser 30 below a reaction feedstock material feed point, and mixes with the regenerated catalyst fed through the regeneration standpipe 33. The opening of the slide valve (slide valve 26 in catalyst delivery pipe of regenerated catalyst purification controller) in the first delivery pipe (catalyst delivery pipe 24 of regenerated catalyst purification controller) is controlled depending on the reaction temperature (temperature measuring point 83 at catalyst mixing and pre lifting section) below the feedstock material feeding point of the reactor, so as to control an amount of the catalyst which is fed from the regenerated catalyst purification controller 2. Through a second delivery pipe (catalyst delivery pipe 23 of regenerated catalyst purification controller), the catalyst is fed downward under the action of gravity into a gas phase reaction zone II of the reactor above the reaction feedstock material oil feeding point. The opening of the adjustment valves (valve 90 for adjusting steam or air fed into regenerated catalyst purification controller, and valve 91 for adjusting steam fed into regenerated catalyst purification controller) of the operating medium (steam or air 43, and steam 44) pipelines of the regenerated catalyst purification controller 2, depending on the temperature difference (difference 81 between the temperatures of the purification controller and the supplement temperature measuring point at gas phase reaction zone) between the measurement point (supplement temperature measuring point 84 at gas phase reaction zone) located between the reaction zone catalyst feeding point and the reaction feedstock material feeding point and the temperature measurement point catalyst temperature measuring point 80 of regenerated catalyst purification controller) of catalyst within the second delivery pipe (catalyst delivery pipe 23 of regenerated catalyst purification controller) of the regenerated catalyst purification controller 2, so as to control the temperature (catalyst temperature measuring point 80 of regenerated catalyst purification controller) of the regenerated catalyst purification controller 2, thereby supplying the catalyst as required to the gas phase reaction zone II of the reactor. Steam 44 is fed into the regenerated catalyst purification controller 2 at the bottom portion thereof, passes upward through the stripping zone 27 and cooling zone 28 of the regenerated catalyst purification controller 2, and is discharged through the upper discharging pipeline 29 of the regenerated catalyst purification controller.

Figure 2:
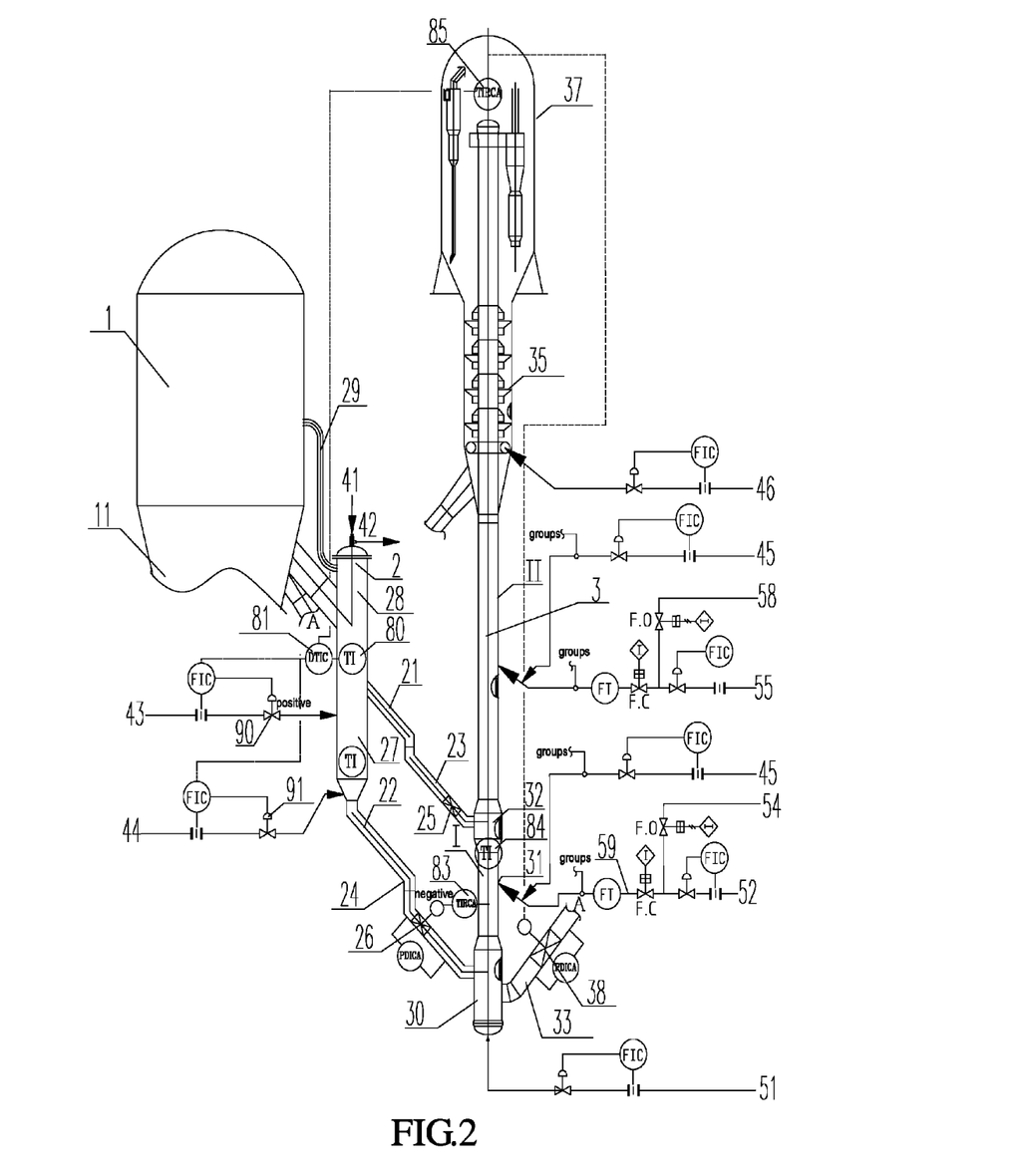
FIG. 2 is a schematic diagram showing a process of a method for controlling catalyst in reaction zones and cooling regenerated catalyst according to another embodiment of the invention.

FIG. 2 is a schematic diagram showing a process of a method for controlling catalyst in reaction zones and cooling regenerated catalyst according to another embodiment of the invention. Regenerated catalyst is fed into a reactor 3 through three passages. The regenerated catalyst from a regenerator 1 is fed directly into a catalyst mixing riser 30 at a bottom of the reactor 3 through a regeneration standpipe 33; after the reaction finishes, the regenerated catalyst is stripped of oil and gases carried by it at a stripping section 35, and returns to a coke-burning drum 12 of the regenerator through a used catalyst standpipe 34 (the used catalyst standpipe 34 and the regenerator coke-burning drum 12 are not labeled in FIG. 1, and are shown with reference to FIG. 4). The rest of the catalyst from the regenerator 1 is treated by the regenerated catalyst purification controller 2, and is then fed under the action of gravity into the reactor 3 through two delivery pipes (catalyst delivery pipes 23, 24 of regenerated catalyst purification controller); after the reaction finishes, the regenerated catalyst is stripped of oil and gases carried by it at the stripping section 35, and returns to the coke-burning drum 12 of the regenerator. Through a first delivery pipe (catalyst delivery pipe 24 of regenerated catalyst purification controller), the catalyst is fed downward under the action of gravity into a catalyst mixing riser 30 below a reaction feedstock material feed point, and mixes with the regenerated catalyst fed through the regeneration standpipe 33. The opening of the slide valve (slide valve 26 in catalyst delivery pipe of regenerated catalyst purification controller) in the first delivery pipe (catalyst delivery pipe 24 of regenerated catalyst purification controller) is controlled depending on the reaction temperature (temperature measuring point 83 at catalyst mixing and pre lifting section) below the feedstock material feeding point of the reactor, so as to control an amount of the catalyst which is fed from the regenerated catalyst purification controller 2. Through a second delivery pipe (catalyst delivery pipe 23 of regenerated catalyst purification controller), the catalyst is fed downward under the action of gravity into a gas phase reaction zone II of the reactor above the reaction feedstock material oil feeding point. The opening of the adjustment valves (valve 90 for adjusting steam or air fed into regenerated catalyst purification controller, and valve 91 for adjusting steam fed into regenerated catalyst purification controller) of the operating medium (steam or air 43, and steam 44) pipelines of the regenerated catalyst purification controller 2, depending on the temperature difference between the reaction temperature measuring point 85 at the outlet of the reactor 3 and the temperature measurement point (catalyst temperature measuring point 80 of regenerated catalyst purification controller) of catalyst within the second catalyst delivery pipe (catalyst delivery pipe 23 of regenerated catalyst purification controller) of the regenerated catalyst purification controller 2, so as to control the temperature (catalyst temperature measuring point 80 of regenerated catalyst purification controller) of the regenerated catalyst purification controller 2, thereby supplying the catalyst as required to the gas phase reaction zone II of the reactor. Steam 44 is fed into the regenerated catalyst purification controller 2 at the bottom thereof, passes upward through the stripping zone 27 and cooling zone 28 of the regenerated catalyst purification controller 2, and is discharged through the upper discharging pipeline 29 of the regenerated catalyst purification controller.

Figure 3:
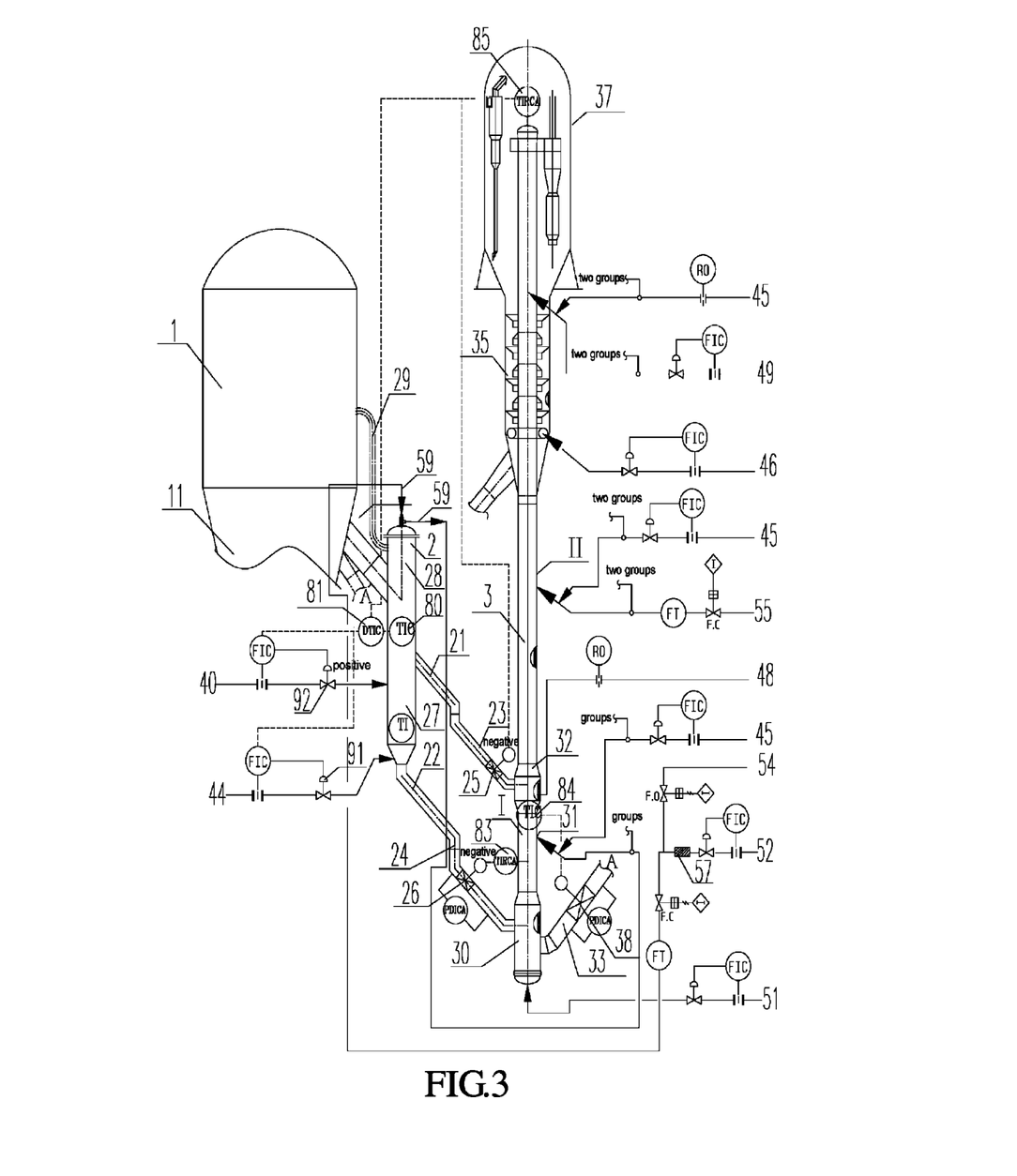
FIG. 3 is a schematic diagram showing a process of a method for controlling catalyst in reaction zones and cooling regenerated catalyst according to another embodiment of the invention.

FIG. 3 is a schematic diagram showing a process of a method for controlling catalyst in reaction zones and cooling regenerated catalyst according to another embodiment of the invention. The embodiment of FIG. 3 is the same as the embodiment of FIG. 2, except that pressurized air 40 is fed into the regenerated catalyst purification controller 2 above the steam 44 feeding port, and reaction feedstock material (mixed oil 59 of feedstock oil and recycle oil) is heated within the heat exchanger tube of the regenerated catalyst purification controller 2, and is then fed into the reactor 3 via a feed nozzle 31.

Figure 4:
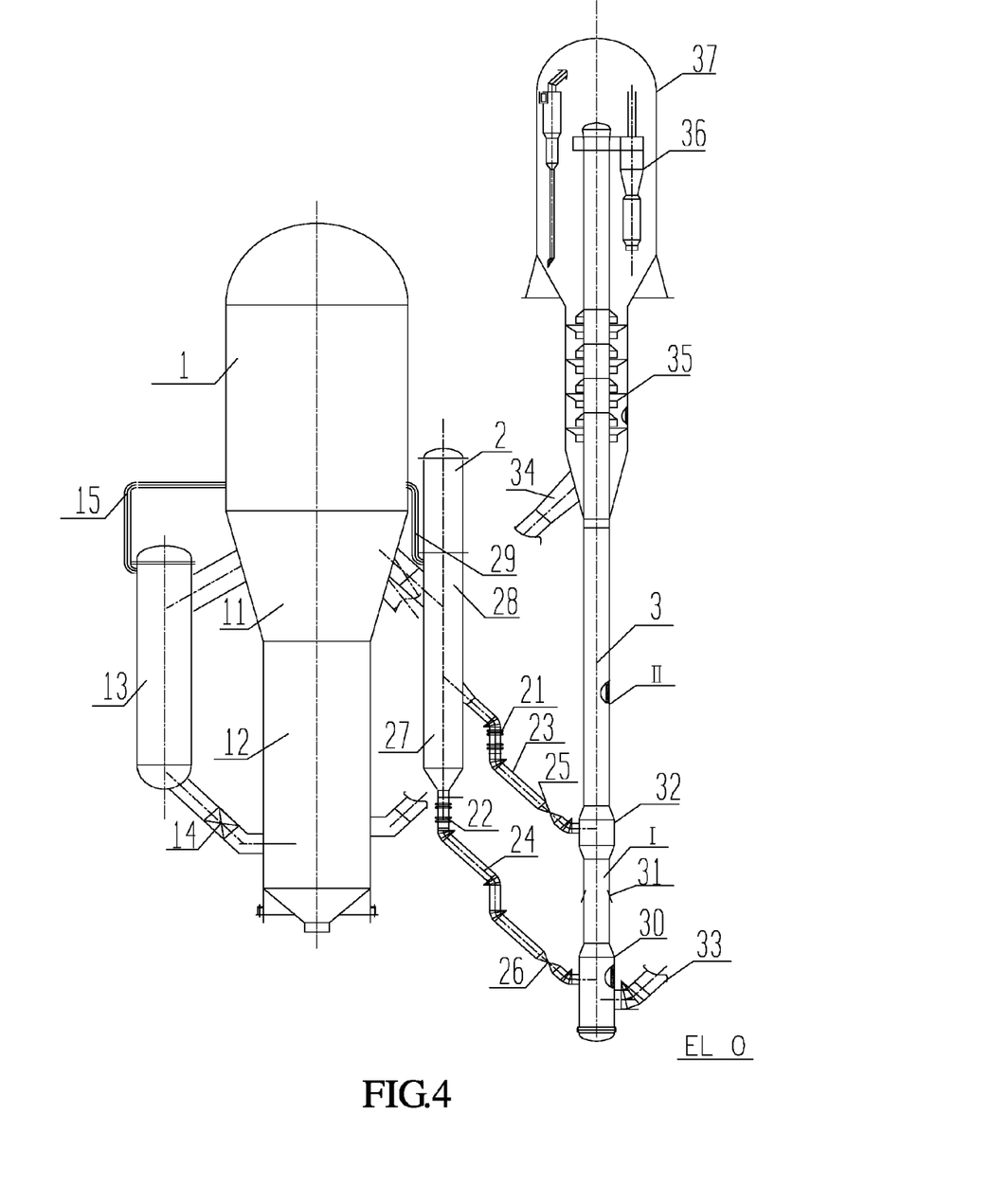
FIG. 4 is a schematic diagram showing an apparatus for controlling catalyst in reaction zones and cooling regenerated catalyst according to the invention.
Figure 6:
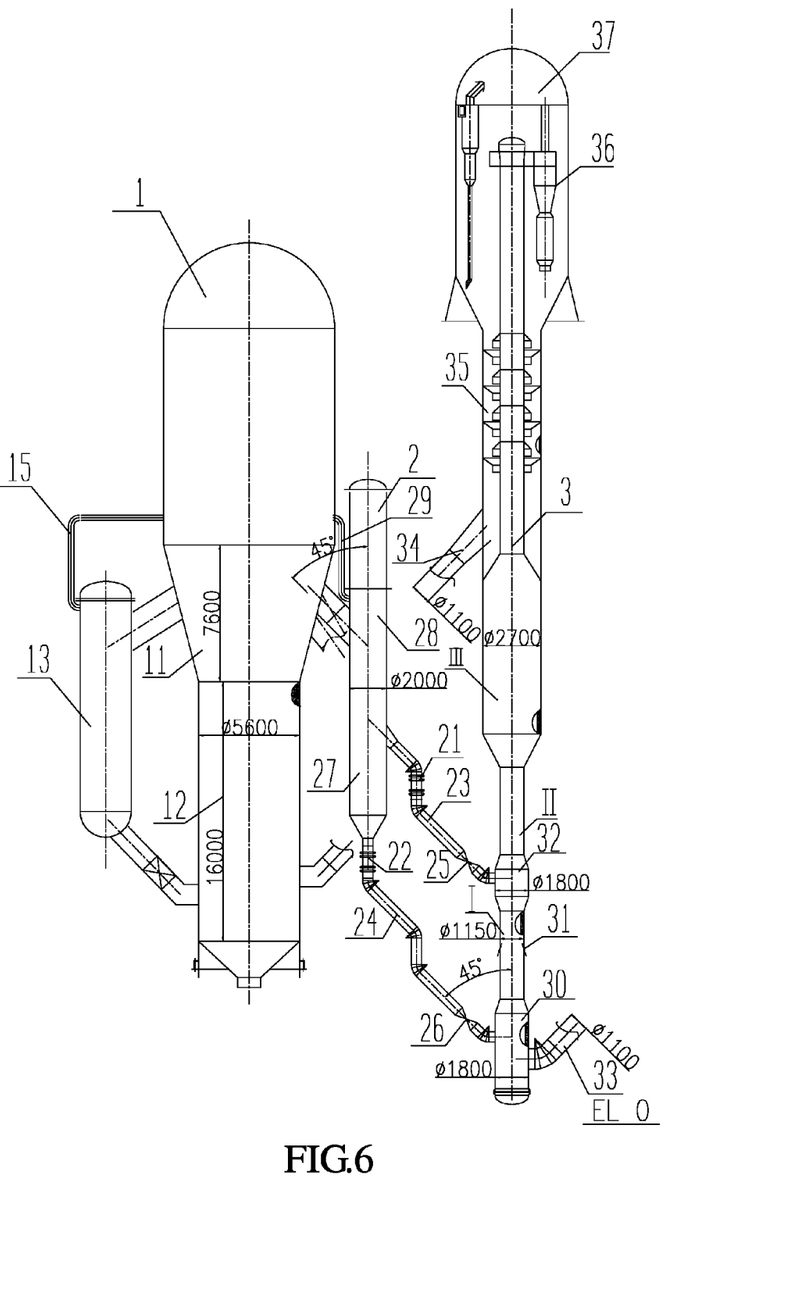
FIG. 6 is a schematic diagram showing Example Two of an apparatus for controlling catalyst in reaction zones and cooling regenerated catalyst.

FIG. 4 is a schematic diagram showing an apparatus for controlling catalyst in reaction zone and purifying and cooling regenerated catalyst according to the present invention. The regenerator 1 is connected with both the external cooler 13 and the regenerated catalyst purification controller 2, which is connected with the reactor 3 via two delivery pipes (i.e., catalyst delivery pipes 23, 24 of the regenerated catalyst purification controller). The first delivery pipe (i.e., catalyst delivery pipe 24 of the regenerated catalyst purification controller) extends from the bottom of the regenerated catalyst purification controller 2 to the catalyst mixing riser 30; and the second delivery pipe (i.e., catalyst delivery pipe 23 of the regenerated catalyst purification controller) extends from the middle and low portion of the regenerated catalyst purification controller 2 to the connection port of the catalyst distributor 32 above the feed nozzle 31 of the reactor. Nevertheless, the riser reactor in FIG. 6 is provided above the gas phase reaction zone II with a diameter enlarged reaction section (diameter enlarged reaction zone) III.

EXAMPLES

Example One

Figure 5:
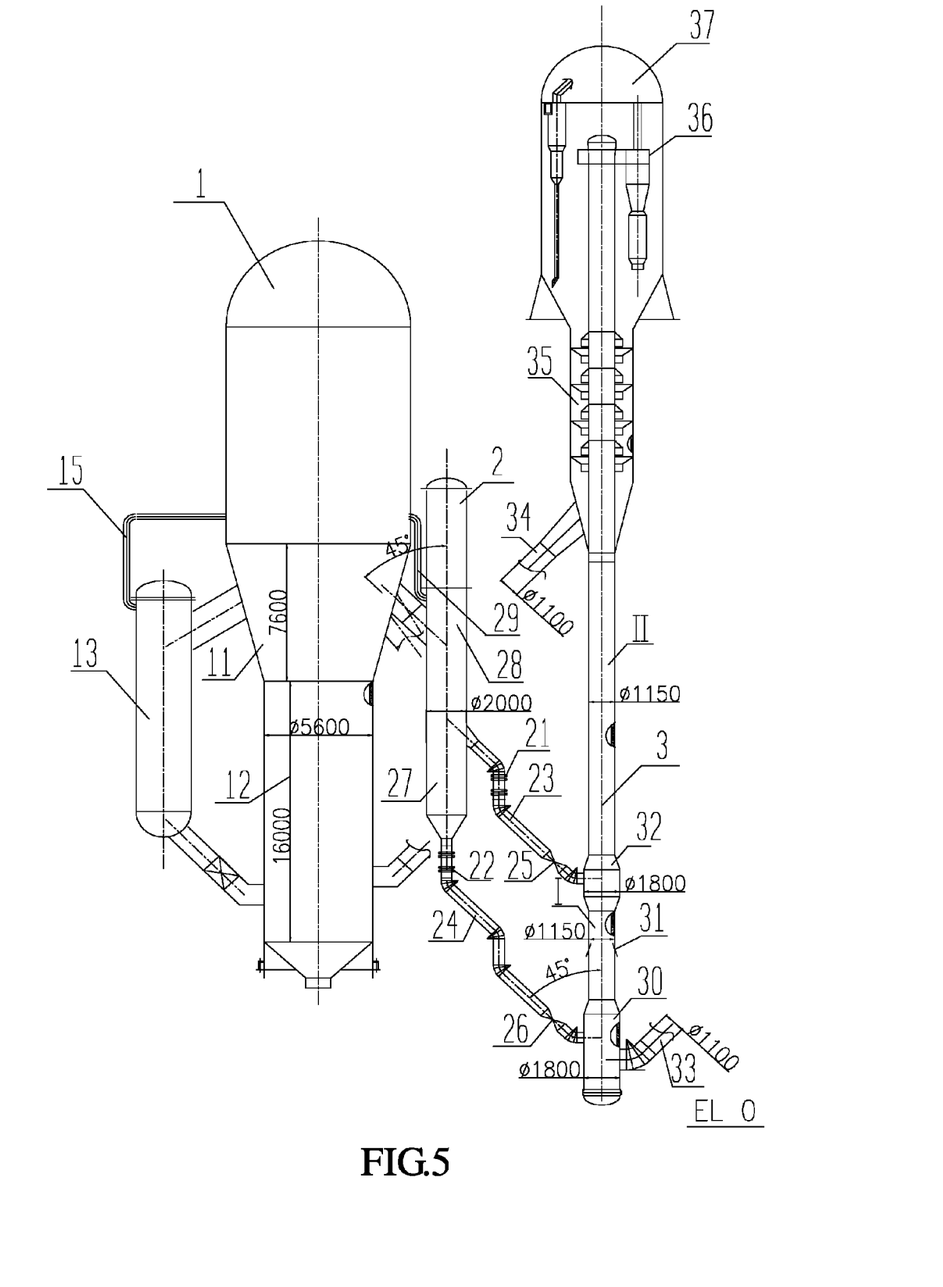
FIG. 5 is a schematic diagram showing Example One of an apparatus for controlling catalyst in reaction zones and cooling regenerated catalyst.
Figure 7:
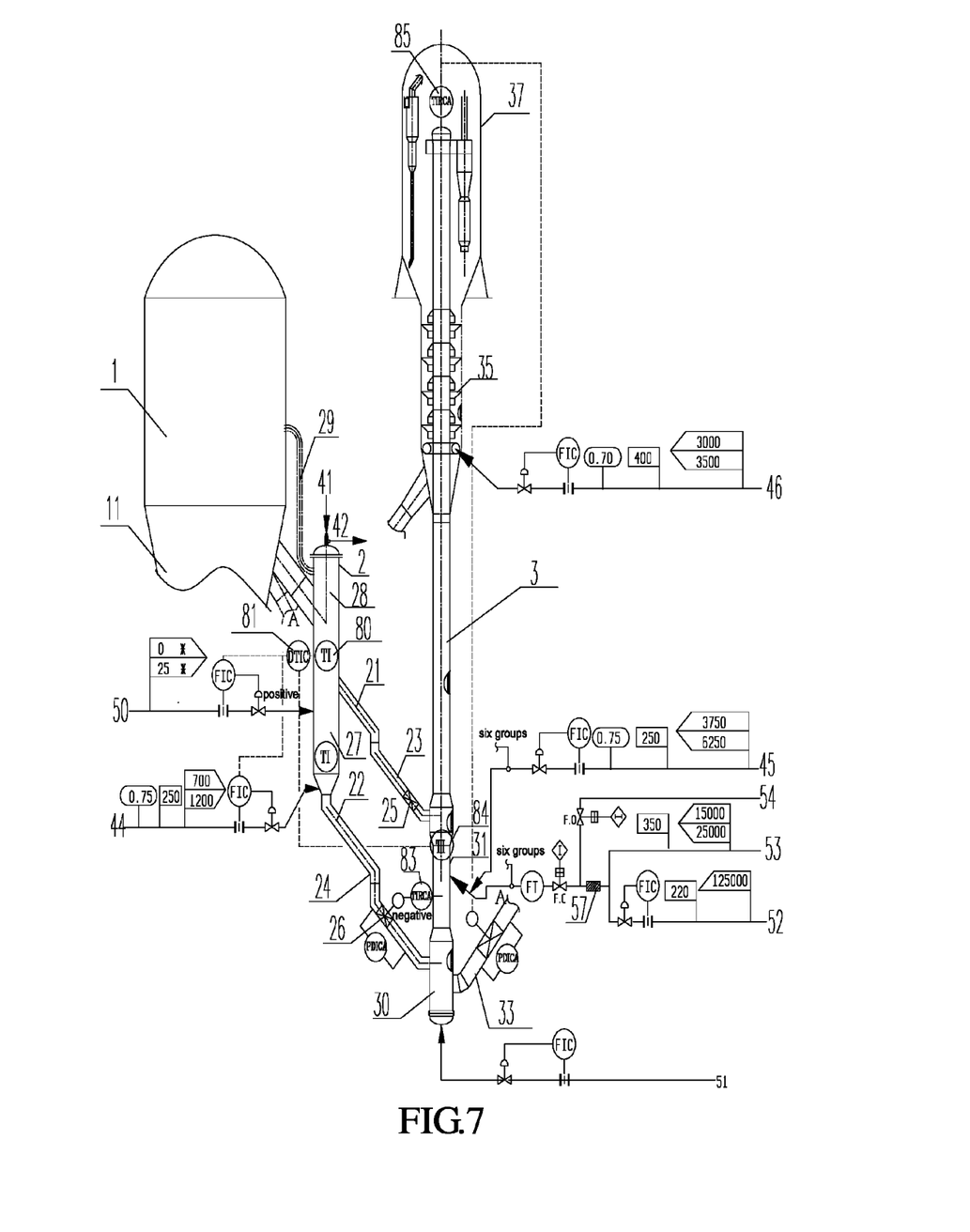
FIG. 7 is a schematic diagram of a process of Example One of the invention.

The apparatus for controlling catalyst in reaction zones and cooling regenerated catalyst of this example is shown in FIG. 5. The process is shown in FIG. 7.

A catalytic cracking apparatus with feed of petroleum hydrocarbons having a yield of 100×104 t/a, includes a coke-burning drum for regeneration and a riser reactor 3, with reaction and regeneration disposed in parallel. The regenerated catalyst purification controller 2 generates steam with a middle pressure. The regenerated catalyst purification controller 2 is a type of purification controller having gas liquid separation device, which is directly connected to the regenerated catalyst purification controller 2 and has the same diameter as the purification controller. The reaction materials and reaction conditions of Example One and the Comparative Example of the prior art are set forth in the table below.

|  | | Example | | Comparative Example |
|---|---|---|---|---|
| Items | Unit | Value | Unit | Value |
| Amount of Feedstock oil 52 | t/h | 125 | t/h | 125 |
| Density | Kg/m3 | 0.93 | Kg/m3 | 0.93 |
| residual carbon | W % | 4.1 | W % | 4.1 |
| Feeding temperature of feedstock oil 52 | ° C. | 230 | ° C. | 230 |
| temperature 85 at the outlet of the reactor | ° C. | 500 | ° C. | 500 |
| Catalyst temperature of catalyst mixing pre lifter 30 | ° C. | 655 | ° C. | 690 |
| Temperature of supplement temperature measuring point 84 at gas phase reaction zone II | ° C. | 530 | ° C. | 530 |
| difference 81 between the temperatures of the purification controller 2 and the supplement temperature measuring point at gas phase reaction zone II | ° C. | −10 | | |
| Reaction time from the feed point to the gas phase reaction zone II | s | 0.2 | | |
| Total reaction time | s | 2.6 | s | 2.6 |
| Amount of regenerated catalyst | t/h | 834 | t/h | 834 |
| Amount of catalyst from the first catalyst delivery pipe 24 | t/h | 157 | t/h | 0 |
| Amount of catalyst fed into the gas phase reaction zone II | t/h | 162 | t/h | 0 |
| ratio of total reaction catalyst to oil | | 9.22 | | 6.67 |
| Amount of steam required by the regenerated catalyst purification controller | Kg/h | 980 | Kg/h | 0 |

The dimensions of the apparatus of Example One of the invention and that of the Comparative Example of the prior art are set forth in the table below.

| Items | Example Unit | Value | Comparative Example Unit | Value |
|---|---|---|---|---|
| Diameter of coke-burning drum 12 | Mm | 5600 | Mm | 5800 |
| Height of coke-burning drum 12 | Mm | 16000 | Mm | 16000 |
| Diameter of dilute phase section of regenerator 1 | Mm | 9500 | Mm | 9800 |
| Diameter of catalyst mixing pre lifter 30 of reactor | Mm | 1800 | Mm | 1600 |
| Diameter of gas phase reaction zone II of reactor | Mm | 1150 | Mm | 1000 |
| Diameter of catalyst distributor 32 at gas phase reaction zone II of reactor | Mm | 1800 | | |
| Diameter of regenerated catalyst purification controller 2 | Mm | 2000 | | |
| Area of heat exchanger tube within regenerated catalyst purification controller 2 | m2 | 90 | | |
| Diameter of regenerated catalyst feed pipe of regenerated catalyst purification controller 2 | Mm | 1100 | | |
| Diameter of first catalyst delivery pipe 24 | Mm | 350 | | |
| Diameter of second catalyst delivery pipe 23 | Mm | 350 | | |
| Diameter of gas discharging pipe 29 of regenerated catalyst purification controller 2 | Mm | 250 | | |
| Diameter of steam feed pipe of regenerated catalyst purification controller 2 | Mm | 200 | | |

The proportion of reaction products of Example One and the Comparative Example is set forth in the table below.

| Components | Example Unit | Value | Comparative Example Unit | Value |
|---|---|---|---|---|
| Dry gas | W % | 2.9 | W % | 3.6 |
| Liquefied gas | W % | 12 | W % | 11.9 |
| Gasoline | W % | 42 | W % | 41.9 |
| Diesel oil | W % | 30.1 | W % | 29.7 |
| Heavy oil | W % | 3.6 | W % | 3.3 |
| Coke | W % | 8.9 | W % | 9.1 |
| Loss | W % | 0.5 | W % | 0.5 |
| Total | W % | 100 | W % | 100 |

Example Two

Figure 8:
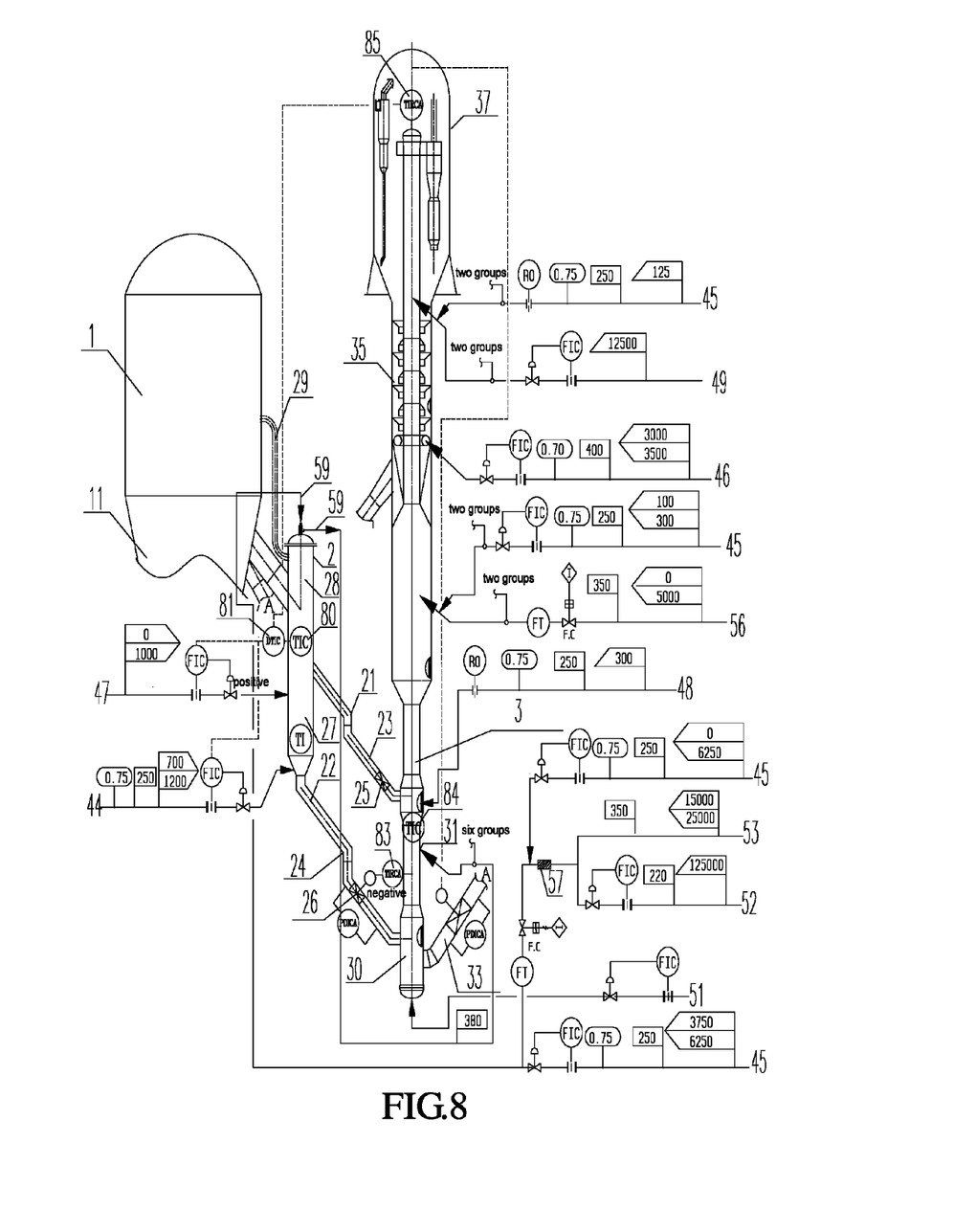
FIG. 8 is a schematic diagram of a process of Example Two of the invention.

The apparatus for controlling catalyst in reaction zones and cooling regenerated catalyst of this example is shown in FIG. 6. The process is shown in FIG. 8.

A catalytic cracking apparatus with feed of petroleum hydrocarbons having a yield of 100×104 t/a, includes a coke-burning drum for regeneration and a riser reactor 3, with reaction and regeneration disposed in parallel. The reactor is provided with a diameter enlarged reaction section III above the gas phase reaction zone II, and other conditions of Example Two are the same as those of Example One. The reaction materials and the reaction conditions of Example Two and the Comparative Example of the prior art are set forth in the table below.

| Items | Example Unit | Value | Comparative Example Unit | Value |
|---|---|---|---|---|
| Amount of Feedstock oil 52 | t/h | 125 | t/h | 125 |
| Density | Kg/m3 | 0.93 | Kg/m3 | 0.93 |
| residual carbon | W % | 4.1 | W % | 4.1 |
| Feeding temperature of feedstock oil 52 | ° C. | 230 | ° C. | 230 |
| temperature 85 at the outlet of the reactor | ° C. | 500 | ° C. | 500 |
| Catalyst temperature 83 of catalyst mixing riser | ° C. | 655 | ° C. | 690 |
| Temperature of supplement temperature measuring point 84 at gas phase reaction zone II | ° C. | 530 | ° C. | 530 |
| difference 81 between the temperatures of the purification controller 2 and the supplement temperature measuring point at gas phase reaction zone II | ° C. | −10 | | |
| Reaction time from the feed point to the gas phase reaction zone II | s | 0.2 | | |
| Total reaction time | s | 5.4 | s | 5.4 |
| Reaction time at diameter enlarged section III of reactor | s | 4.0 | s | 4.0 |
| Amount of regenerated catalyst | t/h | 834 | t/h | 834 |
| Amount of catalyst from the first catalyst delivery pipe 24 | t/h | 157 | t/h | 0 |
| Amount of catalyst fed into the gas phase reaction zone II | t/h | 162 | t/h | 0 |
| ratio of total reaction catalyst to oil | | 9.22 | | 6.67 |
| Amount of steam required by the regenerated catalyst purification controller 2 | Kg/h | 980 | Kg/h | 0 |

The dimensions of the apparatus of Example Two of the invention and that of the Comparative Example of the prior art are set forth in the table below.

| Items | Example | | Comparative Example | |
|---|---|---|---|---|
| | Unit | Value | Unit | Value |
| Diameter of coke-burning drum 12 | Mm | 5600 | Mm | 5800 |
| Height of coke-burning drum 12 | Mm | 16000 | Mm | 16000 |
| Diameter of dilute phase section of regenerator 1 | Mm | 9500 | Mm | 9800 |
| Diameter of catalyst mixing pre lifter 30 of reactor | Mm | 1800 | Mm | 1600 |
| Diameter of gas phase reaction zone II of reactor | Mm | 1150 | Mm | 1000 |
| Diameter of catalyst distributor 32 at gas phase reaction zone II of reactor | Mm | 1800 | | |
| Diameter of reaction diameter enlarged zone III of reactor | Mm | 2700 | Mm | 2200 |
| Diameter of regenerated catalyst purification controller 2 | Mm | 2000 | | |
| Area of heat exchanger tube within regenerated catalyst purification controller 2 | m2 | 90 | | |
| Diameter of regenerated catalyst feed pipe of regenerated catalyst purification controller 2 | Mm | 1100 | | |
| Diameter of first catalyst delivery pipe 24 | Mm | 350 | | |
| Diameter of second catalyst delivery pipe 23 | Mm | 350 | | |
| Diameter of gas discharging pipe 29 of regenerated catalyst purification controller 2 | Mm | 250 | | |
| Diameter of steam feed pipe of regenerated catalyst purification controller 2 | Mm | 200 | | |

The proportion of reaction products of Example Two and the Comparative Example is set forth in the table below

| Components | Example | | Comparative Example | |
|---|---|---|---|---|
| | Unit | Value | Unit | Value |
| Dry gas | W % | 2.8 | W % | 3.2 |
| Liquefied gas | W % | 12 | W % | 12.2 |
| Gasoline | W % | 42 | W % | 41.9 |
| Diesel oil | W % | 30.1 | W % | 29.5 |
| Heavy oil | W % | 3.5 | W % | 3.3 |
| Coke | W % | 9.1 | W % | 9.4 |
| Loss | W % | 0.5 | W % | 0.5 |
| Total | W % | 100 | W % | 100 |

The invention claimed is:

1. A method for controlling catalyst in reaction zones and purifying and cooling regenerated catalyst, the method being used in the catalytic reaction process with a petroleum hydrocarbon feedstock or an alcohol feedstock, is characterized that the method comprises controlling a reaction process and controlling catalyst fed into a reactor, wherein an apparatus used in the method comprises a reactor, a catalyst regenerator, a regenerated catalyst purification controller, and catalyst delivery pipes, wherein controlling the reaction process includes controlling contact, gasification and reaction of liquid phase feedstock oil and catalyst, controlling gas phase cracking reaction process after the feedstock oil is gasified, and controlling a temperature at an outlet of the reactor, and wherein controlling catalyst fed in the reactor includes controlling a temperature of the regenerated catalyst and controlling purification of gases carried by the catalyst fed into the reactor, wherein at least a portion of the regenerated catalyst is fed into the purification controller, and is then cooled by a heat exchanger tube, thereby controlling a temperature of the regenerated catalyst, and simultaneously, the carried gases, including nitrogen, carbon dioxide, and oxygen, are replaced by steam, wherein the catalyst which reaches a required temperature and meets the requirements for the carried gases is fed downward under the action of gravity through the catalyst delivery pipes into the reactor below a reaction feedstock material feed point and at a lower portion of a gas phase cracking reaction zone located above a gasification zone of reaction feedstock material respectively, so that the reactor realizes a multiple-level control of gasification before reaction, cracking reaction after liquid phase gasification, and reaction conditions at the outlet of the reactor, and simultaneously, nitrogen, oxygen and carbon dioxide carried by the regenerated catalyst are limited to be fed into the reactor, wherein, in the step of controlling the catalyst fed into the reactor, the regenerated catalyst is fed into the reactor through three passages, wherein some of the regenerated catalyst from the regenerator is fed directly into a bottom of the reactor below a feedstock oil feed point, i.e. into a pre lifting section, through a regeneration standpipe, and after the rest of the regenerated catalyst is cooled within the purification controller so that the temperature is controlled to reach the required temperature, and gas mediums carried by the regenerated catalyst are replaced, the rest of the regenerated catalyst is fed into different zones of the reactor through two delivery pipes, each of which is provided therein with a valve for controlling a flow of catalyst, wherein through a first delivery pipe of the two delivery pipes, the catalyst from the regenerated catalyst purification controller is fed downward under the action of gravity into the pre lifting section of the reactor below the reaction feedstock material feed point, and mixes with the regenerated catalyst fed through the regeneration standpipe, thereby decreasing a temperature of the regenerated catalyst within the pre lifting section, wherein an amount of the cooled catalyst which is fed from the regenerated catalyst purification controller through the first delivery pipe is adjusted so as to control the temperature of catalyst in the pre lifting section before the regenerated catalyst contacts the feedstock oil, and control and improve a ratio of catalyst to oil in the gasification zone, wherein through a second delivery pipe of the two delivery pipes, the cooled and purified catalyst from the regenerated catalyst purification controller is fed downward under the action of gravity into the gas phase reaction zone above the reaction feedstock material feed point at the lower portion of the gas phase cracking reaction zone located above the gasification zone, wherein the purifying and cooling the regenerated catalyst comprises controlling the purification of the regenerated catalyst by stripping the carried gases in the purification controller, controlling a temperature of the regenerated catalyst in the purification controller, adjusting steam in the purification controller, and providing a stripped gas discharging pipe and regenerated catalyst feeding and discharging pipes to the purification controller, wherein the regenerated catalyst is fed from the regenerator through one input pipe and is discharged through two delivery pipes from the purification controller into the reactor, the steam is fed into a bottom region of the purification controller, stripping medium and the gases carried by the regenerated catalyst are discharged from an upper portion of the purification controller, a steam feeding pipe is provided therein with an adjustment valve, which is controlled depending on a temperature of the catalyst within the regenerated catalyst purification controller or a difference between the temperature at the corresponding point in the reaction zone and the temperature of the catalyst within the regenerated catalyst purification controller, wherein a catalyst temperature measurement point is disposed below the reaction feedstock material feed point, and the opening of the valve in the first delivery pipe is controlled depending on the temperature of this catalyst temperature measurement point, thereby adjusting an amount of the catalyst which is fed from the regenerated catalyst purification controller into the reactor, and wherein an amount of the catalyst which takes part in the gas phase cracking reaction zone of the reactor is controlled depending on the opening of the valve in the second delivery pipe.

2. The method according to claim 1, characterized in that, the temperature of the catalyst below the feedstock material feed point of the reactor is controlled by a slide valve in the first delivery pipe of the regenerated catalyst purification controller; the reaction temperature between the feedstock material feed point and the gas phase reaction zone of the reactor is controlled by a slide valve in the regeneration standpipe; the temperature at the outlet of the reactor is controlled by a slide valve in the second delivery pipe which controls an amount of catalyst which is fed from the regenerated catalyst purification controller; or the temperature at the outlet of the reactor is controlled by the slide valve in the regeneration standpipe; and the temperature of the catalyst within the regenerated catalyst purification controller is controlled, depending on the difference between the temperatures at the disposed points of the reactor, by adjusting the amount of the fed gases via the adjustment valve, or depending the difference between the temperatures at the catalyst feed point of the gas phase cracking reaction zone and at the reaction feedstock material feed point of the reactor, wherein an amount of an operating medium of the regenerated catalyst purification controller is controlled, thereby adjusting the temperature of the catalyst within the purification controller, or wherein the opening of the adjustment valve in an operating medium pipeline of the regenerated catalyst purification controller is controlled depending on a difference between the temperature at the outlet of the reactor and the temperature within the regenerated catalyst controller, so that the adjustment valve in turn adjusts an amount of the operating medium fed into the regenerated catalyst purification controller, thus achieving the control of the temperature of the catalyst within the regenerated catalyst purification controller in association with the reaction temperature within the reactor, such that the catalyst fed into the gas phase reaction zone of the reactor always adapts to the conditions within the reactor, or wherein the opening of the adjustment valve in the operating medium pipeline of the regenerated catalyst purification controller is controlled depending on the temperature within the regenerated catalyst purification controller, thus adjusting an amount of the operating medium and achieving the control of the temperature of the catalyst output from the regenerated catalyst purification controller.

3. The method according to claim 1, characterized in that, the catalyst of the regenerated catalyst purification controller is fed through the second delivery pipe into the gas phase reaction zone of the reactor within a space occupying a reaction time of between 0.1 s and 1.0 s from the reaction feedstock material feed point, or within a region spaced by a distance of between 1.0 m and 10 m, above from the reaction feedstock material feed point.

4. The method according to claim 1, characterized in that, the regenerated catalyst purification controller is provided within an upper portion thereof with the heat exchanger tube, within which the reaction feedstock material is heated while the regenerated catalyst is cooled, and the reaction feedstock material is then fed into the reactor, or within which the steam is generated, wherein the regenerated catalyst purification controller is provided within an lower portion thereof with a region where the gases carried by the catalyst are replaced.

5. The method according to claim 1, characterized in that, before the reaction feedstock material is fed into and heated within the heat exchanger tube of the regenerated catalyst purification controller, the reaction feedstock material is filled with water which occupies not more than 20% by weight of the reaction feedstock material, wherein the reaction feedstock material is heated and then fed into the reactor.

6. The method according to claim 1, characterized in that, the gas phase reaction zone of the reactor is provided at a point for feeding the cooled purified catalyst with a catalyst mixing and distributing section, the mixing and distributing section having a diameter greater than a diameter of the reactor at this point.

7. The method according to claim 1, characterized in that, the total gas phase reaction zone of the reactor after the feedstock oil is gasified is configured as a riser reactor, or a reaction section is disposed above the mixing and distributing section at the point for feeding the cooled purified catalyst and after cracking reaction of the feedstock oil, wherein within the diameter enlarged reaction section, a flow speed of gas phase varies from 1.8 m/s to 4.0 m/s, and the reaction time varies from 3.0 s to 5.5 s.

* * * * *